700# UNITED STATES PATENT OFFICE.

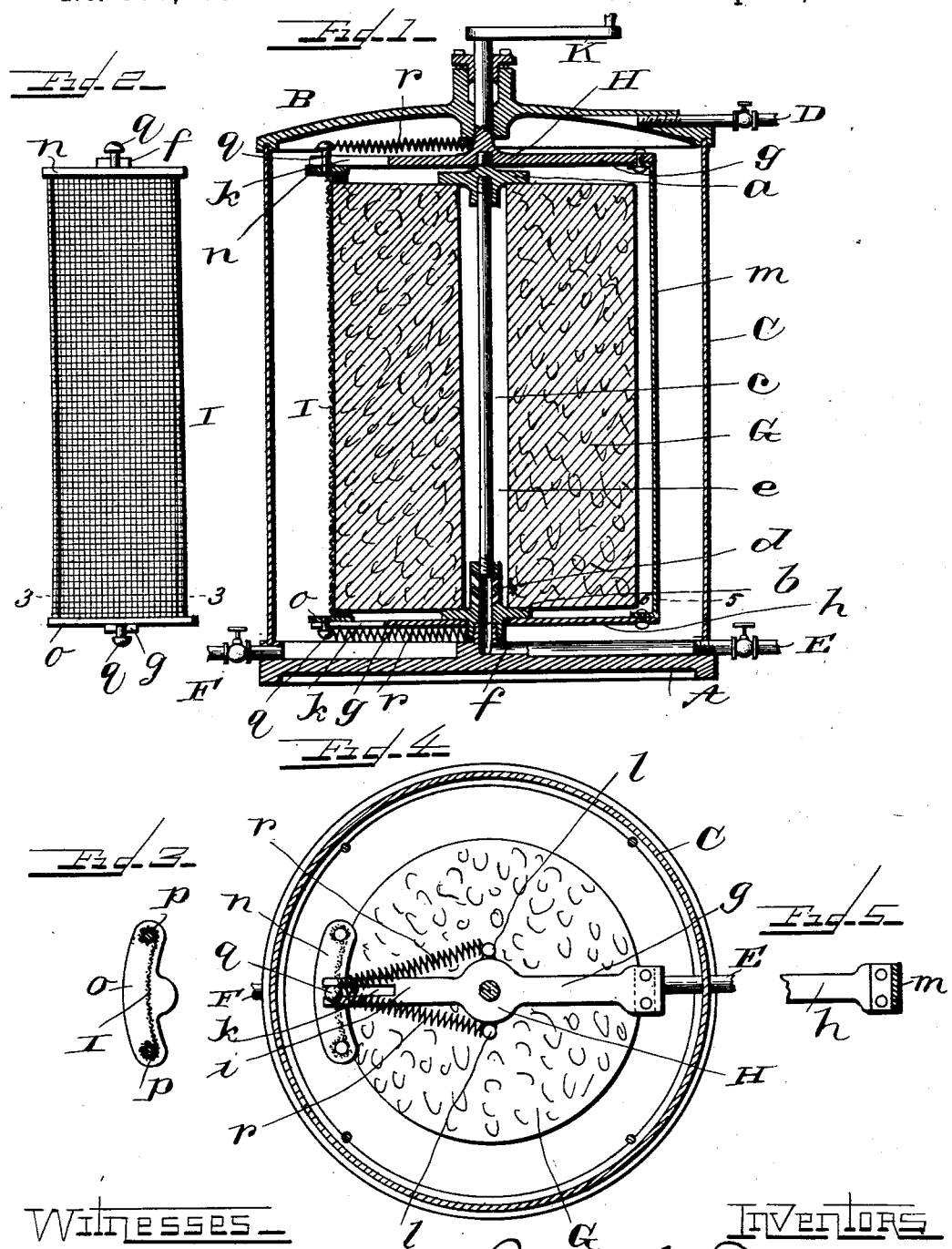

JOHN M. DAVIDSON AND CHARLES C. SCAIFE, OF ALLEGHENY, PENNSYLVANIA, ASSIGNORS TO JAMES VERNER SCAIFE, OF SAME PLACE.

FILTER.

SPECIFICATION forming part of Letters Patent No. 580,209, dated April 6, 1897.

Application filed October 15, 1896. Serial No. 608,906. (No model.)

*To all whom it may concern:*

Be it known that we, JOHN M. DAVIDSON and CHARLES C. SCAIFE, citizens of the United States, residing at Allegheny, in the county of Allegheny and State of Pennsylvania, have invented certain new and useful Improvements in Filters; and we do hereby declare the following to be a full, clear, and exact description of the invention, such as will enable others skilled in the art to which it appertains to make and use the same.

Our invention relates to filters, and has especial reference to that class of filters known as "Pasteur" filters, in which a tubular porous body is used for relieving water of its impurities.

Filters as generally constructed use charcoal or sand or other like material as filtering media. The granules of the charcoal, being of a porous and spongy nature, become receptacles for the accumulation of animal and vegetable matter that is taken up from the water, decomposes and breeds bacteria, and as the water must pass through the charcoal granules it becomes contaminated rather than purified, while those using sand rely upon some chemical to coagulate the impurities in the water before it enters the filtering-chamber, and on account of the character of the filtering media used require the use of wire-gauze or other foraminous screens to arrest the particles of the filtering media and prevent their escape and consequent waste. The screens also become receptacles for the mud and slime and other deleterious matter, which adds to the impure and unwholesome character of the water sought to be purified.

In the use of porous bodies as filtering media brushes have been used to remove the accumulated mud and slime, but the bristles of the brushes and the spaces between the bunches become so filled with the mud and slime that their work is imperfectly done, and the accumulation in the brush itself cannot be removed without removing the brush from the filter and cleansing it separately, which is inconvenient and requires the removal of the top or cover of the filter. To overcome these objections, it has been proposed to apply a fixed scraper with a thin edge bearing upon the periphery of the porous body, but owing to the softness of the stone or porous body the scraper cuts it away very rapidly. It has also been proposed to clean the porous body by surrounding it by a body of granular material, such as sand, and clean the porous body by frictional contact with the sand, but in the practical use of sand for this purpose the sand being densest at the bottom of the granular bed it cuts or wears the porous body away more rapidly at that point than where the granular material is free and in suspension, and as a result the porous body assumes the form of an inverted cone and is thereby depreciated as a filtering media.

It is our purpose to dispense with the use of charcoal, sand, chemicals, wire or other screens, brushes, and scrapers with an edge bearing upon the porous body, and effect the cleaning and purifying of water by the use of a porous body provided with means for effectually removing all accumulations of foreign matter from its surface that shall itself be cleansed by the water that is cleansing the porous body; and to this end our invention consists in certain improvements in construction, which will be fully described in the following specification and claims.

In the accompanying drawings, which form part of this specification, Figure 1 represents a vertical section of our improved filter; Fig. 2, a side elevation of the cleaner detached; Fig. 3, a transverse section of the line 3 3, Fig. 2; Fig. 4, a top plan view of the filter with the cover or top removed; and Fig. 5, a transverse section of the bar of the frame on line 5 5, Fig. 1.

Reference being had to the drawings and the letters thereon, A indicates the bottom, B the top or cover, and C the wall, of a filter, and they constitute a stationary or fixed body of a filter; D a supply-pipe, E a pipe for drawing off filtered water, and F a waste-water pipe for discharging the water used for cleansing the filter-body; G a tubular porous body, preferably of tripoli, which is secured between two disks *a b*, connected by a rod *c*, the lower end of which engages a perforated boss *d* on the disk *b*, through which perforations the water passing through the porous body to its central chamber *e* is discharged into passage *f* and pipe E.

H indicates a frame composed of upper and lower bars $g$ $h$, one arm $i$ of each of which is provided with a slot $k$ in its outer end, and in the center or any preferred part of the bars are lugs $l$ $l$ and a vertical bar $m$, and between the arms $g$ and $h$ on one side is supported a cleaner having a head-piece $n$, a tail-piece $o$, and connecting-rods $p$ $p$, upon which is secured wire-cloth I, preferably brass, which is soldered to the rods $p$ $p$, so that the wire-cloth is inside of the rods and forms a concave inner surface which conforms to the periphery of the porous body G. The cleaner is connected to the bars $g$ $h$ by screw-studs $q$ $q$, which are secured to the head and tail pieces and engage the slots $k$ in the bars and to the studs $q$ $q$, whose opposite ends are connected to the lugs $l$ $l$ and draw the cleaner against the periphery of the porous body with just sufficient pressure to rub off the deposit of mud and slime.

The frame H is revolved by a crank K, and as the cleaner moves upon the surface of the porous body the mud and slime passes through the interstices in the wire-cloth, and the water in which the cleaner is revolving washes all the mud and slime off the wire-cloth by its passage through the interstices and leaves the porous body and the cleaner absolutely free from deleterious matter, and as the porous body gradually wears away the springs draw the cleaner toward the body, and thus compensate for the wear. The cleaner being held in position on the frame H by the studs $q$ $q$ it is free to oscillate on the arms $h$ $g$ to accommodate itself to any hard substance which may form on the porous body.

Having thus fully described our invention, what we claim is—

1. A filter provided with a stationary or fixed casing and a tubular filtering-body, in combination with a revoluble frame surrounding said body and provided with a laterally-movable cleaner, slotted arms at both ends of said frame to which said cleaner is connected and the cleaner engaging the periphery of the filtering-body.

2. A filter provided with a stationary or fixed casing and a tubular filtering-body, in combination with a revoluble frame surrounding said body and provided with a foraminous cleaner, slotted arms at both ends of said frame and springs connected to the cleaner and to said frame for holding the cleaner in contact with the periphery of the filtering-body.

3. A filter provided with a stationary or fixed casing and a tubular filtering-body, a revoluble frame surrounding said body in combination with a foraminous cleaner supported by said frame to move laterally and oscillate thereon and springs at both ends of the frame connected to the cleaner and to said frame.

4. A filter provided with a stationary or fixed casing and a tubular filtering-body, in combination with a revoluble and oscillatory wire-cloth cleaner engaging the periphery of the body and means at both ends of the filtering-body for holding said cleaner in operative engagement therewith.

In testimony whereof we affix our signatures in presence of two witnesses.

JOHN M. DAVIDSON.
CHAS. C. SCAIFE.

Witnesses:
A. FRASER LEGGATE,
A. J. MALONEY.